(12) United States Patent
Whitt

(10) Patent No.: US 12,483,009 B2
(45) Date of Patent: Nov. 25, 2025

(54) POWER SOURCE EMULATOR AND METHOD FOR TESTING SWITCHGEAR

(71) Applicant: M.C. Dean, Inc., Tysons, VA (US)

(72) Inventor: Ronald Rube Whitt, Boydton, VA (US)

(73) Assignee: ModularMC, LLC, McLean, VA (US)

( * ) Notice: Subject to any disclaimer, the term of this patent is extended or adjusted under 35 U.S.C. 154(b) by 186 days.

(21) Appl. No.: 18/519,864

(22) Filed: Nov. 27, 2023

(65) Prior Publication Data

US 2024/0305074 A1 Sep. 12, 2024

Related U.S. Application Data

(60) Provisional application No. 63/451,396, filed on Mar. 10, 2023.

(51) Int. Cl.
*H02B 13/035* (2006.01)
*G01R 31/00* (2006.01)
(Continued)

(52) U.S. Cl.
CPC ....... *H02B 13/0352* (2013.01); *G01R 31/003* (2013.01); *G01R 31/282* (2013.01);
(Continued)

(58) Field of Classification Search
CPC .. H02B 13/035; H02B 13/0352; H02B 11/26; H01H 33/02; H01H 33/022; H02H 3/334;
(Continued)

(56) References Cited

U.S. PATENT DOCUMENTS

| 6,629,044 B1 * | 9/2003 | Papallo, Jr. ........ H01H 11/0062 324/424 |
| 2005/0057254 A1 * | 3/2005 | Diercks ................ G01R 31/327 324/424 |
| 2023/0138101 A1 | 5/2023 | Pérez De Ayala Rull et al. |

FOREIGN PATENT DOCUMENTS

| CN | 203933481 U | * 11/2014 |
| CN | 107144756 A | 9/2017 |
| CN | 111505497 B | 10/2022 |

OTHER PUBLICATIONS

Av Spekter d.o.o. "MST-204 Machinery Switchgear Tester, HVA-204 High Voltage Adapter" Development and production of advanced measuring instruments of electrical quantities, Jan. 31, 2023.

* cited by examiner

*Primary Examiner* — Douglas X Rodriguez
*Assistant Examiner* — Kendrick X Liu
(74) *Attorney, Agent, or Firm* — Studebaker Brackett PLLC

(57) ABSTRACT

A power source emulator is provided for testing programmable switchgear that switches to an alternative three-phase power source upon sensing a failure of a grid source. The emulator provides three simulated three-phase power sources for testing switchgear. Each source is identical in voltage and phase to the current normally distributed by the switchgear but has less than 1% of the amperage. Each power source includes a single three-phase contactor for simultaneously controlling all three phases of the power source, and three solid-state relays for controlling each of the three phases of the power source. A control circuit controls the three-phase contactor and each of the three solid state relays of each power source to simulate various types of power failures that the switchgear is programmed to respond to.

16 Claims, 3 Drawing Sheets

(51) Int. Cl.
*G01R 31/28* (2006.01)
*G01R 31/30* (2006.01)
*G01R 31/3163* (2006.01)
*H01H 33/02* (2006.01)
*H02B 11/26* (2006.01)
*H02H 3/33* (2006.01)

(52) U.S. Cl.
CPC ..... *G01R 31/3004* (2013.01); *G01R 31/3163* (2013.01); *H01H 33/022* (2013.01); *H02B 11/26* (2013.01); *H02H 3/335* (2013.01)

(58) Field of Classification Search
CPC ...... H02H 3/335; G01R 31/003; G01R 31/28; G01R 31/282; G01R 31/30; G01R 31/3004; G01R 31/316; G01R 31/3163
See application file for complete search history.

POWER SOURCE EMULATOR AND METHOD FOR TESTING SWITCHGEAR

FIELD OF THE INVENTION

This invention is generally concerned with an apparatus and method for testing programmable switchgear and is specifically concerned with a portable power source emulator that provides a simulated power supply input into the switchgear to be tested that is identical in voltage, phase, and other characteristics to the output of an actual power supply but is vastly reduced in amperage.

BACKGROUND

Some buildings such as hospitals and data centers require very stable power, as power interruptions can cause the shut-down of life-support devices in intensive care units, or a catastrophic loss of data from the banks of servers in data centers. Such buildings derive this stability by having a power system comprising either multiple sources of utility power or a backup source comprising batteries and an on-site generator. All of these power systems are controlled by a programmable system of relays and other high current switches that is generally referred to as switchgear, but which also may be one or more automatic transfer switches (ATS) and/or a transfer control panel (TCP). In this application, the term "switchgear" is used to refer to all such programmable switching systems. The built-in programming of such switchgear allows them to provide an Uninterruptible Power Supply (UPS) to the electrical equipment of the building by transferring the electrical load of the building to an alternative power source upon sensing a failure of the primary power source. Under such a failure, the switchgear should function to switch the power from one source to another quickly enough so that the functioning of the life-support devices or data center servers continues seamlessly.

Because of the switchgear's critical role in maintaining constant power to the servers and other mission critical equipment, it must be thoroughly tested before being put into service. Even though the manufacturers often test a sample type of their switchgear with the owner's representative in a factory-witness test before shipping it to the building contractors, the switchgear used in any particular building is usually shipped in several shipping splits that are assembled by the electrical contractor on the job site, thus creating uncertainty in how the final system will function. Additionally, the switchgear should also be periodically tested even after being put into service to make sure that it will function properly during a grid failure or other anomaly.

Conventionally, testing of the switchgear equipment is done at the end of construction and just before turnover to the building owner. In major installations, switchgear is installed on-site and then tested by connecting a load bank on its output side to simulate the power load of the building, and the full load capabilities of the power source (which is typically three-phase 480 volts at the rated ampacity of the main breakers) on its input side. Various power failure scenarios, such as the loss of one or more phases of a power source, or complete loss of a grid-supplied power source are then simulated by shutting off one or more of the power supply circuit breakers. The response of the switchgear to each type of power failure scenario is carefully monitored to determine whether the switchgear seamlessly switches over to the alternative power supply such that the operation of the load-drawing electrical equipment in the building is not compromised.

SUMMARY OF THE INVENTION

While such testing effectively determines whether the switchgear can operate properly, it is accompanied by several shortcomings. Most notably, such on-site testing is cumbersome and time-consuming to implement. First, a large and heavy external load bank must be situated as close as possible to the switchgear but outside of the building. A set of heavy high ampacity DLO cables often referred to as "load bank cables" must then be connected to the load bank. Each load bank cable is capable of conducting 400 A of current per phase. A 4000 A service would require connecting 10 sets of cables per phase for a total of 30 cables. These cables would need to extend from the output bus of the switchgear to the external load bank which may require multiple sets of cables depending on how far away the external load bank is. Setting up for testing generally takes a few hours to a day depending on the location and distance from the testing panel. Prior to the full-load testing, technicians operate the breakers with a simulated 24 VDC control signal manually or by a remote operator station if one is provided. The simulation of the 24 VDC control signals to the circuit breakers that control a power transfer is done by removing or adding jumpers. To simulate a loss of one or more phases of power, the technicians must manually remove fuses or leads, which requires them to perform lock-out tag out procedures and wear voltage rated gloves and other personal protective equipment (PPE) to test for an absence of voltage before each change in configuration for testing. The high amperage of the 480-volt test currents exposes the technicians to dangerous and destructive arcing, necessitating additional PPE such as arc flash suits and the use of remote operating devices if they are available.

The testing itself can take several more hours and consumes a considerable amount of power. If any issues arise during the testing, it can delay the turnover of the equipment to the building owner and could delay the start-up of the building. If the switchgear is proven to be defective or if damage occurs during testing from, e.g., an arc flash, it must be either repaired on site where access is limited due to space limitations inside the building, or replaced with another switchgear unit, which can also delay the start-up of the building. The testing of switchgear with other on-site permanent equipment also exposes such other equipment to potential damage if an incident occurs.

Accordingly, there is a need for a safer and more efficient device and method of testing switchgear. Ideally, such a device and method could reliably and thoroughly test the switchgear equipment without the need for situating a large and bulky load bank, moving and connecting the associated heavy copper cables, and without the use of the high, 400 A operational currents and their associated safety hazards. It would also be desirable if the testing could be conducted in an off-site facility before the switchgear is transported and installed where it can be easily repaired or replaced, thereby avoiding potential delays in the start-up of the building. Finally, it would be advantageous if the testing device were compact, lightweight, and portable so that transportation, set-up, and take-down of the testing device could be done quickly and easily.

The invention is a portable power source emulator that allows the switchgear equipment to be functionally tested off-site before installation in the data center or other building and early in the construction process so that not only the functionality of the equipment can be determined, but also whether all the components, programming, and settings perform in accordance with the predetermined standards. The portable power source emulator provides a simulated power supply input into the switchgear to be tested that is identical in voltage, phase, and other characteristics to the output of an actual power supply but is vastly reduced in amperage and hence provides a safer method of testing. The reduced amperage test currents provided by the emulator obviates the need for the use of either a large and bulky load bank or sets of heavy, 400 A capacity load bank cables as well as the work required to install the cables and to remove them after testing. The use of the inventive current emulator renders the testing process faster, easier, safer, and much less work intensive. If the owner requires full load testing, then it can be done with a reduced risk of damage since the equipment has been functionally tested and all the protection settings verified.

The portable power source emulator comprises at least two power sources that are detachably connectible to a power input of the switchgear, each of which provides a simulated three-phase power current to the switchgear that is identical in voltage and phase to the current distributed by the switchgear during normal operation but having less than 1% of the amperage normal rated amperage of a 4000 A source. The power sources include a simulated primary power source and a simulated alternative power source, each of which is detachably connectable to the main input bus of the switchgear via "jumper cable" type clamps. Each source includes a single three-phase contactor for simultaneously controlling all three phases of the power source, and three solid-state relays connected downstream of the three-phase contactor for controlling each of the three phases of the power source. A control circuit is connected to the three-phase contactor and each of the three solid state relays of each power source for opening and closing different combinations of the contactor and solid-state relays to simulate various types of power failures that the switchgear is programmed to respond to.

While the use of solid-state relays advantageously reduces the size of the emulator, applicant found via experimentation that the voltage leakage inherent in such devices provided unreliable test results as the relays or other automatic switches in the switchgear would sometimes fail to detect a cutoff of one or more phases of the simulated power source. However, instead of reverting to larger mechanical relays to solve this problem, applicant found that the provision of a single, three-phase contactor connected in series with three solid-state relays solved the reliability problem without the need for using three contactors (or other types of mechanical switches) for each three-phase source, thereby rendering the power source emulator smaller, lighter, and more easily portable.

The control circuit further includes a switchgear signal circuit detachably connectible to a signal output or input terminal of the switchgear via banana clips that can both receive and send control signals intended to activate the alternative power source in the event of a failure of the primary power source. In some types of switchgear, the signal circuit detects signals received from the switchgear controlling the starting and stopping of an electrical generator of the alternative power supply. In other types of switchgear, the switchgear signal circuit transmits such signals to the switchgear.

The portable power source emulator can simulate a loss of power from the grid and the transition to the UPS of the building, as well as the loss of one or two phases of one or more three-phase power sources to test whether the switchgear will execute the switching sequences required to ensure that the servers or life support equipment operate properly through such disruptions. Complete loss of a power source, loss of one or two phases of a source, generator start signal, generator bell (alarm) signal, and a generator emergency power off signal are all controlled by toggle switches mounted on an outside wall of the emulator housing where the operator is stationed with the electrical power management system (EPMS) team at a distance away from the equipment. The source emulator cuts the testing time from 2 days down to 1 day and sometimes a half day while keeping the testing technicians at a safe distance from the equipment and operating at a lower arc flash risk.

The portable power source emulator also has an emergency power-off switch that controls the power at the input side of the emulator housing. This includes a three-phase, 20-amp 480-volt power source that the emulator plugs into that provides the simulated power sources, and a 120-volt power source that the emulator also plugs into that is used to provide the 24 VDC operating power. The emulator also limits the available fault current for both the simulated power sources and the 24 VDC operating power via 15-amp fast acting fuses.

DESCRIPTION OF THE PREFERRED EMBODIMENT

Figure 1:
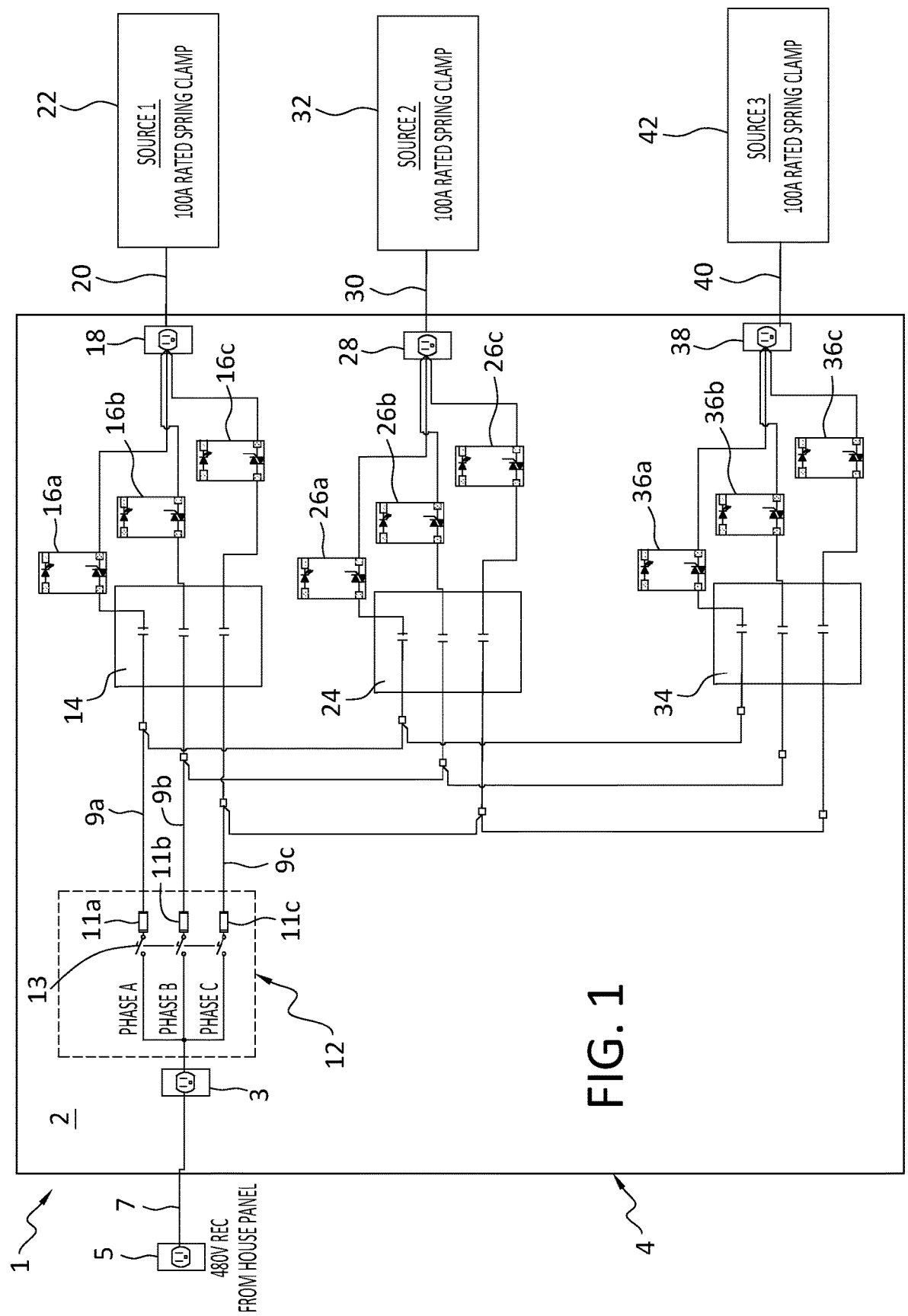
FIG. 1 is a schematic diagram of the power circuit of the source emulator.

With reference to FIG. 1, the emulator 1 includes a power source circuit 2 having a first Source 1 that begins with a 480V, 20 A three-phase male receptacle 3 that is mounted in a side wall of the emulator housing 4. Receptacle 3 is connectible to a 480V, three-phase female receptacle 5 via a power cable 7 having male and female plugs at either end. The 480V, three-phase female receptacle 5 is typically provided by a testing facility (not shown) that is remotely located from the data center or other building where the switchgear being tested will ultimately be installed. From receptacle 3, the three phases of the power supply current are conducted by wires 9a-c, respectively, via fast-acting fuses 11a-c of a fuseholder 12. The fuses 11a-c limit the current of each phase to a maximum of 15 amps. The fuseholder 12 includes a cut-off switch 13. Downstream of the fuseholder 12, wires 9a-c are individually connected to the three poles of a three-phase contactor 14 which may be, for example, an Electrodepot model no. LC1D32F7. Contactor 14 is capable of simultaneously switching all three phases of the power supply current off in order to simulate a complete loss of Source 1. The opening and closing states of contactor 14 are controlled by a signal current provided by a solid-state relay 15 shown in FIG. 2.

Downstream of contactor 14, each of the three phases of the power source current is serially connected to a solid-state relay 16a-c. In the preferred embodiment, each relay is preferably a Carlo Gavazzi model no. RGC1A60D 15.5 mm 20 A, slim solid-state relay and contactor due to its compact size and relatively low voltage leakage. The solid-state relays 16a-c allow any one phase or any combination of phases of Source 1 to be switched off to simulate a loss of one or more phases. Downstream of the solid-state relays 16a-c each phase of the power source current is connected to a 480V, 20 A three-phase female receptacle 18 that is mounted in an opposite side wall of the emulator housing 4. Receptacle 18 provides the 480V, three-phase outlet power for Source 1 of the emulator, which is connectible to the switchgear (not shown) being tested via a power cable 20 having a male plug at one end for engagement with receptacle 18 and a "jumper cable" type spring clamp 22 at the other end connectable to, for example, a power input terminal of the main bus of the switchgear.

Circuit 2 also includes second and third separate power sources (labeled Source 2 and Source 3 in FIG. 1) that are configured identically to Source 1. Each of these other power sources begins with current from the same 480V, 20 A three-phase male receptacle 3 that powers Source 1 via the parallel connections illustrated in FIG. 1. Sources 2 and 3 each include a three-phase contactor 24 and 34 of the same type as contactor 14 of Source 1. The opening and closing states of contactors 24 and 34 are controlled by a signal current provided by solid-state relays 25 and 35 shown in FIG. 2. Likewise, Sources 2 and 3 each include solid-state relays 26a-c and 36a-c of the same type as solid-state relays 16a-c of Source 1, as well as a female receptacle 28, 38, and power cable 30, 40, having a male plug at one end and a 100 A "jumper cable" type spring clamp 32, 42 at the other end. In use, one of the power sources (e.g., Source 1) would emulate the primary, grid-based power source while another of the power sources (e.g., Source 2) would emulate an alternative power source that the switchgear would switch over to in the event of a failure (whether partial or complete) of the primary power source. While the emulator 1 would seem to need only two power sources to conduct switchgear tests, the provision of Source 3 in the emulator 1 comes from the applicant's recognition that some types of switchgear include multiple alternative power supplies. In such a case, the provision of Source 3 allows the emulator 1 to test such switchgear more easily and quickly.

While the use of solid-state relays 16a-c advantageously reduces the size of the emulator 1, applicant found via experimentation that the current leakage of between 2 and 3 mA and consequent voltage leakage inherent in such devices provided unreliable test results as the automatic switches in the switchgear would sometimes fail to detect a cutoff of one or more phases of the simulated power source. However, instead of reverting to mechanical switching devices to solve this problem, applicant found that the provision of the single, three-phase contactor 14 connected in series with the three solid-state relays 16a-c solved the reliability problem without the need for using three single-pole contactors (or other types of mechanical switches) for each three-phase source, thereby largely retaining the advantages of reduced size and weight and increased portability associated with the use of solid-state relays.

Figure 2:
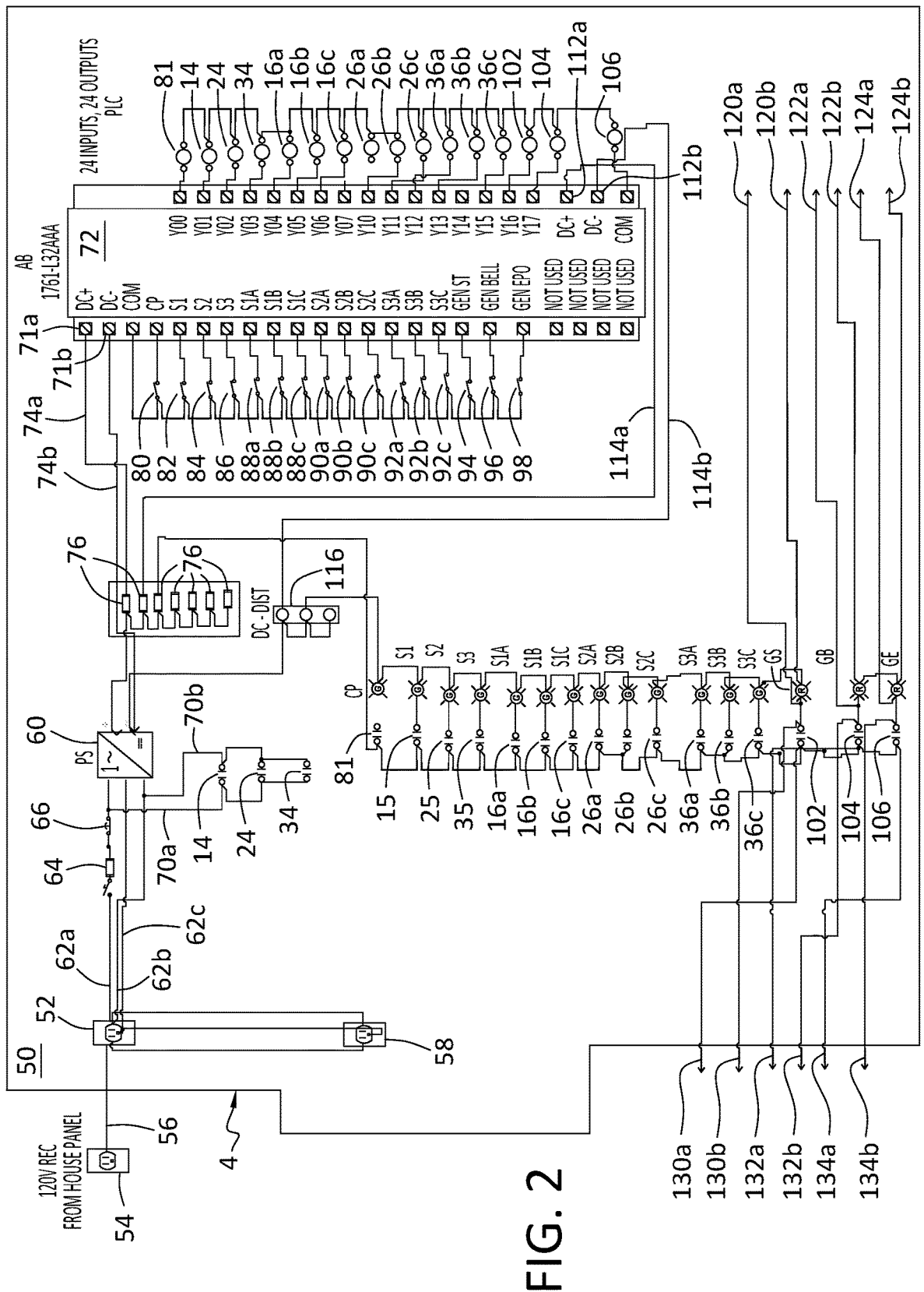
FIG. 2 is a schematic diagram of the control circuitry of the source emulator.
Figure 3:
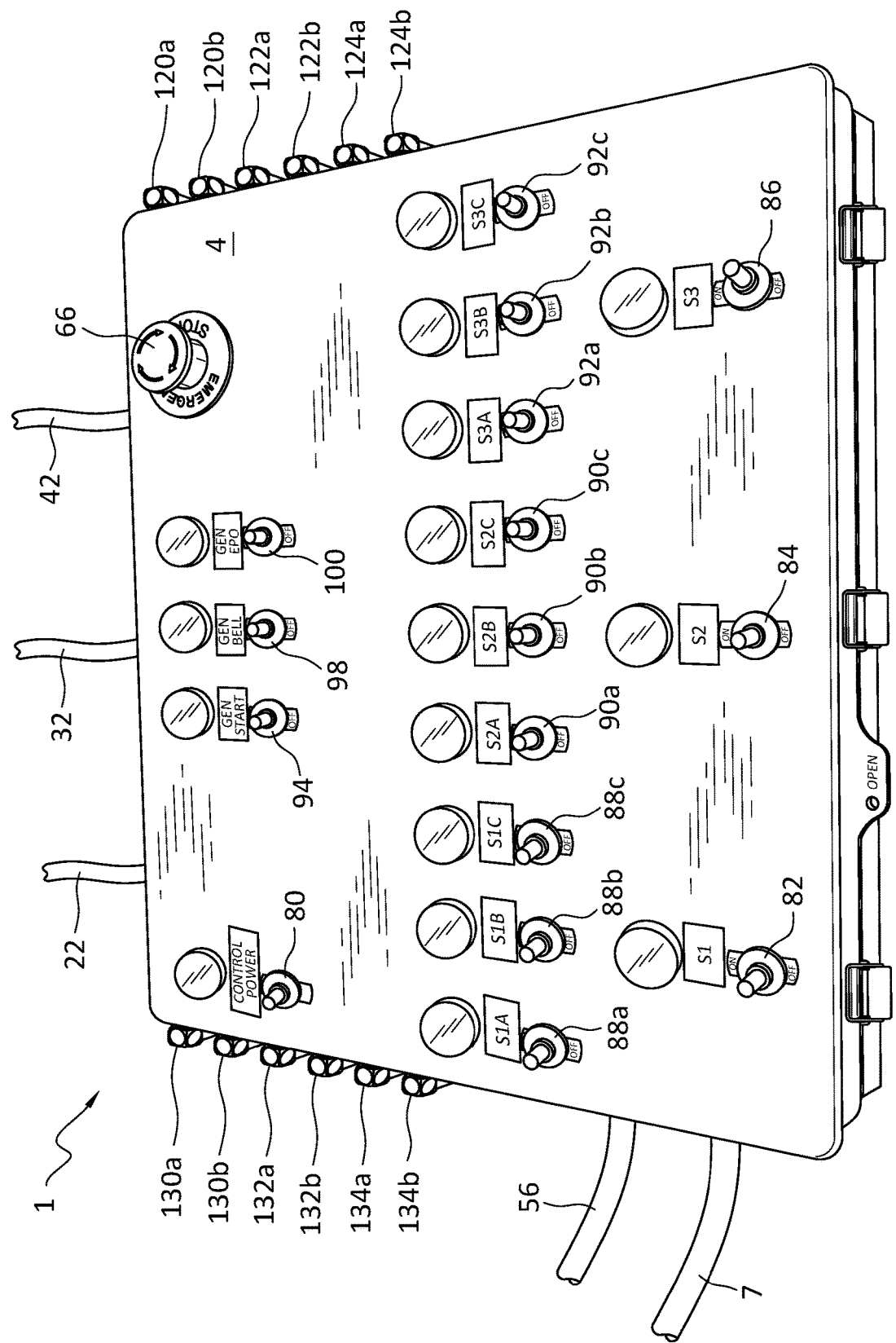
FIG. 3 is a plan view of the housing of the source emulator and the toggle switches used to open and close different combinations of the contactor and solid-state relays to simulate various types of power failures.

FIG. 2 illustrates the power control circuit 50 of the emulator 1. Circuit 50 includes a 120V single-phase male receptacle 52 that is connected to a standard, single phase 120V current female outlet 54 provided by the testing facility via an extension cord 56. An auxiliary single phase 120V female outlet 58 is provided on a side wall of the emulator housing 4 for the convenience of the technicians conducting the switchgear tests who may use it to power their laptops or other equipment. A 24 VDC power supply 60 receives the 120V current provided by the outlet 54 from hot wire 62a via a 15 A fuse 64 disposed in a fuseholder having a cut-off switch. An emergency power off button switch 66 is provided across hot wire 62a so that the operator may quickly turn off the control power should the need arise. Button switch 66 is mounted on the top wall 4 of the emulator housing 4 (as shown in FIG. 3) for easy access. Neutral wire 62c routes the 120V current back from the power supply. Ground wire 62b is provided for safety reasons. Hot and neutral wires 70a and 70b connected in parallel to hot and neutral wires 62a and 62c are in turn connected in parallel to each of the contactors 14, 24, and 34 to power the switching of all three-phases of Source 1, Source 2, and Source 3.

The 24 VDC output of the power supply 60 is conducted to power inlet terminals 71a, 71b of a programmable logic circuit (PLC) 72 via wires 74a and 74b through one of the 5-amp fuses of fuseholder 76. PLC 72 receives control signals on its left, input side from toggle switches 80-100 mounted on a top wall of the emulator housing 4 as shown in FIG. 3. PLC 72 provides 24 VDC control currents from its right, output side to the control power switch 81, the contactors 14, 24, and 34, and the solid-state relays 16a-c, 26a-c, and 36a-c. PLC 72 also provides, from its right side, 24 VDC control currents to a "Generator Start" solid-state relay 102, a "Generator Bell" solid-state relay 104, and a "Generator EPO (Emergency Power Off)" solid-state relay 106. Toggle switch 80 controls the master power switch 81 of the emulator 1, toggle switches 82, 84, and 86 control the three-phase contactors 14, 24, and 34 which respectively turn on or off Sources 1, 2, and 3, while the nine toggle switches 88a-c, 90a-c, and 93a-c control the solid-state relays 16a-c, 26a-c, and 36a-c and hence the individual phases a, b, and c of each of Source 1, Source 2, and Source 3. Finally, three toggle switches 94, 96, and 98, control the "Generator Start" solid-state relay 102, the "Generator Bell" solid-state relay 104, and the "Generator EPO (Emergency Power Off)" solid-state relay 106. In the preferred embodiment, the 24 VDC power supply 60 may be a Mean Well model no. EDR-120-24, while the PLC 72 may be a Garosa model no. FX3U-32MT 24V 16 I/O programmable logic circuit.

The indicator lights labeled CP-GE are powered by the 24 VDC power output terminals 112a, 112b of the PLC 72 via wires 114a, 114b that are in turn connected through a fuse 76 of the fuseholder and terminal block 116, respectively. Wires 118a, 118b from the fuse 76 and the terminal block 116 transmit the 24 VDC from the power output terminals 112a, 112b of the PLC 72 across all of the indicator lights CP-GE and their respective relays as indicated in FIG. 2. Indicator light CP will illuminate upon the closing of the power source switch 80, while lights S1, S2, and S3 will illuminate upon the closing of the switches 82, 84, 86 which signals the PLC to operate the relays 15, 25, 35 that control the three-phase connectors 14, 24, and 34, respectively. Similarly, lights S1A-S1C, S2A-S2C, and S2A-S3C will light up upon the closing of solid-state relays 16a-c, 26a-c, and 36a-c, respectively. Finally, the GS, GB, and GE lights will illuminate upon the closing of solid-state relays 102, 104, and 106 associated with the "Generator Start", "Generator Bell", and "Generator Emergency Power Off" signals, respectively.

In addition to providing simulated power sources S1, S2, and S3, the PLC 72 of the emulator 1 can either provide or receive control signals to or from the switchgear being tested that allow the emulator operator to monitor the response of the switchgear during a condition that warrants a switchover to an alternative power source. For example, in a scenario where the alternative power supply incudes an electrical generator that must start-up and run before power from the alternative power source becomes available, the switchgear—upon detection of a failure of the primary power source—cannot immediately switchover to such an alternative power source. Rather, the switchgear must first sense that the generator has started and is ready to assume the load of the primary power source. To these ends, as shown in FIG. 2, three pairs of 24 VDC control signal contacts 120*a, b*; 122*a, b*, and 124*a, b* are connected to the outputs of solid-state relays 102, 103, and 106 that are associated with "Generator Start", "Generator Bell", and "Generator Emergency Power Off", respectively. Each contact 120*a, b*; 122*a, b*, and 124*a, b* is connectible to a signal input terminal of the switchgear being tested via a 16 gauge cable (not shown) having banana clips or other appropriate connectors on either end.

In testing some types of switchgear, the control signal contacts 120*a, b*; 122*a, b*, and 124*a, b* transmit, from the emulator 1 to the switchgear, a 24 VDC control signal to the switchgear indicating that the generator has started ("Generator Start"), or that the generator is malfunctioning ("Generator Bell"), or that the generator has been turned off ("Generator Emergency Power Off"). The transmission of these 24 VDC signal currents is controlled by toggle switches 94, 96, and 98 and indicated by the on or off state of indicator lights GS, GB, and GE. Other types of switchgear transmit a 24 VDC control signal to the contacts 120*a, b*; 122*a, b*, and 124*a, b* indicating, for example, that the switchgear is transmitting a "Generator Start" or "Generator Emergency Power Off" signal, whereupon indicator lights GS or GE would light up, without the associated relays 102, 106 being closed, being powered by the 24 VDC received from the switchgear even when their associated toggle switches GS and GE are not in the "on" position.

In still other types of switchgear, the control signal either transmitted from or received by the PLC 72 of the emulator 1 is only a "dry" control voltage having no significant power. For such equipment, the emulator 1 is provided with three pairs of "dry contacts" 130*a, b*; 132*a, b* and 134*a, b*, connected to the left side of solid-state relays 102, 104, and 106. In a case where the switchgear being tested either transmits to or receives from the emulator 1 only a control voltage, the PLC 72 will sense such a condition and will close one of the relays 102, 104, and 106 such that the associated indicator light GS, GB, or GE will illuminate from the 24 VDC received from the power supply 60.

One example of the operation of the emulator 1 would be in testing an automatic transfer switch (ATS) wherein the alternative power source includes an electrical generator that must start-up before becoming functional. In such a test, Source 1 of the emulator 1 would be connected to the preferred source terminal of the input bus bar of the ATS while Source 2 would be connected to the alternate source terminal of the ATS via the previously-mentioned "jumper cable" clamps at the ends of the power cables 20 and 30. Since the ATS would transmit a signal for the generator of the alternative power supply to start upon the detection of a failure of the preferred power source, a pair of the signaling contactors (either 120*a, 120b* or 132*a, 132b*, depending upon whether the ATS generates a 24 VDC signal or a "dry" control signal) are connected to the signal outputs of the ATS via the previously mentioned 16 gauge cable having banana clips or other appropriate connectors on either end.

After the connections to the ATS are complete, the testing operator would energize the emulator 1 by plugging in both three-phase 480V power and single phase 120V power provided by the testing facility to the male receptacles 3 and 52, respectively. The operator would then turn on the control power toggle switch 80 which starts the emulator 1 and illuminates the "Control Power" indicator light CP. Next, the operator would turn on Source 1 by flipping toggle switch 82 to close the three-phase contactor 14, and flipping toggle switches 88*a*, 88*b*, and 88*c* to close solid-state relays 16*a-c* to conduct the Source 1 A phase, the Source 1 B phase and the Source 1 C phase. As a result, three-phase 480V power will be conducted to the ATS albeit at a drastically reduced amperage of no more than 15 amps due to the fuses 11*a-c* vs. the 400 amps that the switchgear conducts during normal, load-bearing operation. Upon being connected to Source 1, the ATS would sense that its preferred power source is available.

To test the functionality of the ATS in the event of a complete or partial failure of the preferred power source, the operator would either (1) turn off the Source 1 toggle switch 82 which opens the three-phase contactor and cuts off all three phases of Source 1, or (2) turn off one or two of the toggle switches 88*a-c* which opens one or more of the solid-state relays 16*a-c* to turn off one or two phases of Source 1. In either case, the ATS should then sense a failure of the preferred power source and, after any transfer timers expire, should transmit a "Generator Start" signal through either 24 VDC contactors 120*a*, 120*b* or dry contactors 132*a*, 132*b*. Consequently, the "Generator Start" indicator light GS on the top wall of the emulator housing 4 will illuminate. The operator then will turn on Source 2, Source 2 A phase, Source 2 B phase, and Source 2 C phase by manually operating the toggle switches 84 and 90*a*, 90*b*, and 90*c*. When all the phases of Source 2 are on, the ATS will sense that the alternate source is fully functional and available and will start any transfer timers. When the timers expire the ATS will transfer to Source 2. After the operator has verified that the transfer has occurred in accordance with the transfer control scheme of the ATS, he will then turn back on Source 1 which will power the preferred source to the ATS. Once the ATS senses that the preferred source is available again, it starts its transfer timers. At the conclusion of the timers, it will transfer from Source 2 back to Source 1 and will cease transmitting the "Generator Start" signal. The operator will then determine whether the transfer was within the appropriate time and that the "Generator Start" signal has ceased. This concludes the testing of the ATS. The operator will then switch off the toggle control power switch 80 and remove the Source 1 and Source 2 power cables 20 and 30 as well as the cables connected to either the 24 VDC contactors 120*a*, 120*b* or the dry contactors 132*a*, 132*b*. The testing of switchgear having two or more alternative power sources is essentially the same but requires redundant steps.

The emulator is capable of safely and quickly testing virtually any type of switchgear having one or multiple alternative power sources including not only an ATS but also a transfer control panel (TCP).

Although the invention has been described in detail with particular reference to a preferred embodiment, it will be understood that variations and modifications can be affected within the spirit and scope of the invention. All such variations and modifications are within the scope of this invention, which is limited only by the terms of the appended claims and their equivalents.

The invention claimed is:
1. A power source emulator for testing switchgear that detects different types of failures of a three-phase primary power source and is programmed upon detection of such failure to switch over to an alternative power source, comprising:
- at least two power sources that are detachably connectible to a power input of the switchgear, each of which provides a simulated three-phase power current to the switchgear that is identical in voltage and phase to the current distributed by the switchgear during normal operation but having less than 1% of the amperage, wherein each power source includes a single three-phase contactor for simultaneously controlling all three phases of the power source, and three solid-state relays connected downstream of the three-phase contactor for controlling each of the three phases of the power source, and
- a control circuit connected to the three-phase contactor and each of the three solid state relays of each power source for opening and closing different combinations of the three-phase contactor and the three solid state relays to simulate various types of power failures that the switchgear is programmed to respond to.

2. The power source emulator of claim 1, wherein one of the at least two power sources simulates the primary power source and another of the at least two power sources simulates the alternative power source.

3. The power source emulator of claim 2, wherein the control circuit includes a switchgear signal circuit detachably connectible to a control signal input or control signal output of the switchgear to either transmit or receive switchgear control signals associated with a switchover from a primary power source to an alternative power source.

4. The power source emulator of claim 3, wherein the switchgear signal circuit transmits or receives control signals from the switchgear associated with the starting, malfunction, or shutdown of an electrical generator of an alternative power supply.

5. The power source emulator of claim 1, wherein all of the at least two power sources are derived from a single source of power.

6. The power source emulator of claim 5, comprising three power sources.

7. The power source emulator of claim 1, further comprising a power input detachably connectible to a grid power source identical in voltage and phase to the current distributed by the switchgear during normal operation.

8. The power source emulator of claim 1, further comprising fuses limiting the current of each of the at least two power sources to less than 1% of the current distributed by the switchgear during normal operating conditions.

9. The power source emulator of claim 1, wherein the control circuit includes a programmable logic circuit having an input that receives signals from a plurality of manually-operated switches and an output connected to the three-phase contactor and each of the three solid state relays of each power source that operates the opening and closing of the different combinations of the three-phase contactor and the three solid state relays to simulate various types of power failures that the switchgear is programmed to respond to.

10. The power source emulator of claim 9, further comprising a portable housing that contains the power sources and programmable logic circuit.

11. The power source emulator of claim 10, wherein the manually-operated switches are mounted on a wall of the housing, and further comprising indicator lights also mounted on the wall of the housing for indicating the presence or absence of each of the three phases of each of the three power sources.

12. A method for testing switchgear that detects different types of failures of a three-phase primary power source and is programmed, upon detection of such failure, to switch over to an alternative power source, by means of a power source emulator that includes at least two power sources for simulating a primary and an alternative power source, respectively, each of which provides a simulated three-phase power current to the switchgear that is identical in voltage and phase to the current distributed by the switchgear during normal operation but having less than 1% of the amperage, wherein each power source includes a single three-phase contactor for simultaneously controlling all three phases of the power source, and three solid-state relays connected downstream of the three-phase contactor for controlling each of the three phases of the power source, comprising the steps of:
- detachably connecting power inputs of the switchgear to the simulated primary and secondary power sources;
- opening and closing different combinations of the three-phase contactor and the three solid-state relays of the simulated primary power source to simulate various types of power failures that the switchgear is programmed to respond to, and
- monitoring a response of the switchgear to determine whether the switchgear is responding in accordance with its programming.

13. The method for testing switchgear of claim 12, wherein the opening and closing of different combinations includes opening one or two of the solid-state relays and closing the three-phase contactor to simulate a failure of one or two of the phases of the primary power source.

14. The method for testing switchgear of claim 12, wherein the opening and closing of different combinations includes opening the three-phase contactor to simulate a complete failure of the primary power source.

15. The method for testing switchgear of claim 12, wherein the testing is conducted remotely from a building site where the switchgear will ultimately be installed.

16. The method for testing switchgear of claim 12, wherein the emulator includes a switchgear signal circuit to either transmit or receive switchgear control signals associated with a switchover from the primary power source to the alternative power source and further including the step of detachably connecting the switchgear signal circuit to a control signal input or control signal output of the switchgear.

* * * * *